Aug. 28, 1956
J. BJORKSTEN
2,760,233
METHOD OF MAKING CURVED SHEETS FROM POLYMERIZABLE MATERIAL
Filed Oct. 11, 1952
5 Sheets-Sheet 1
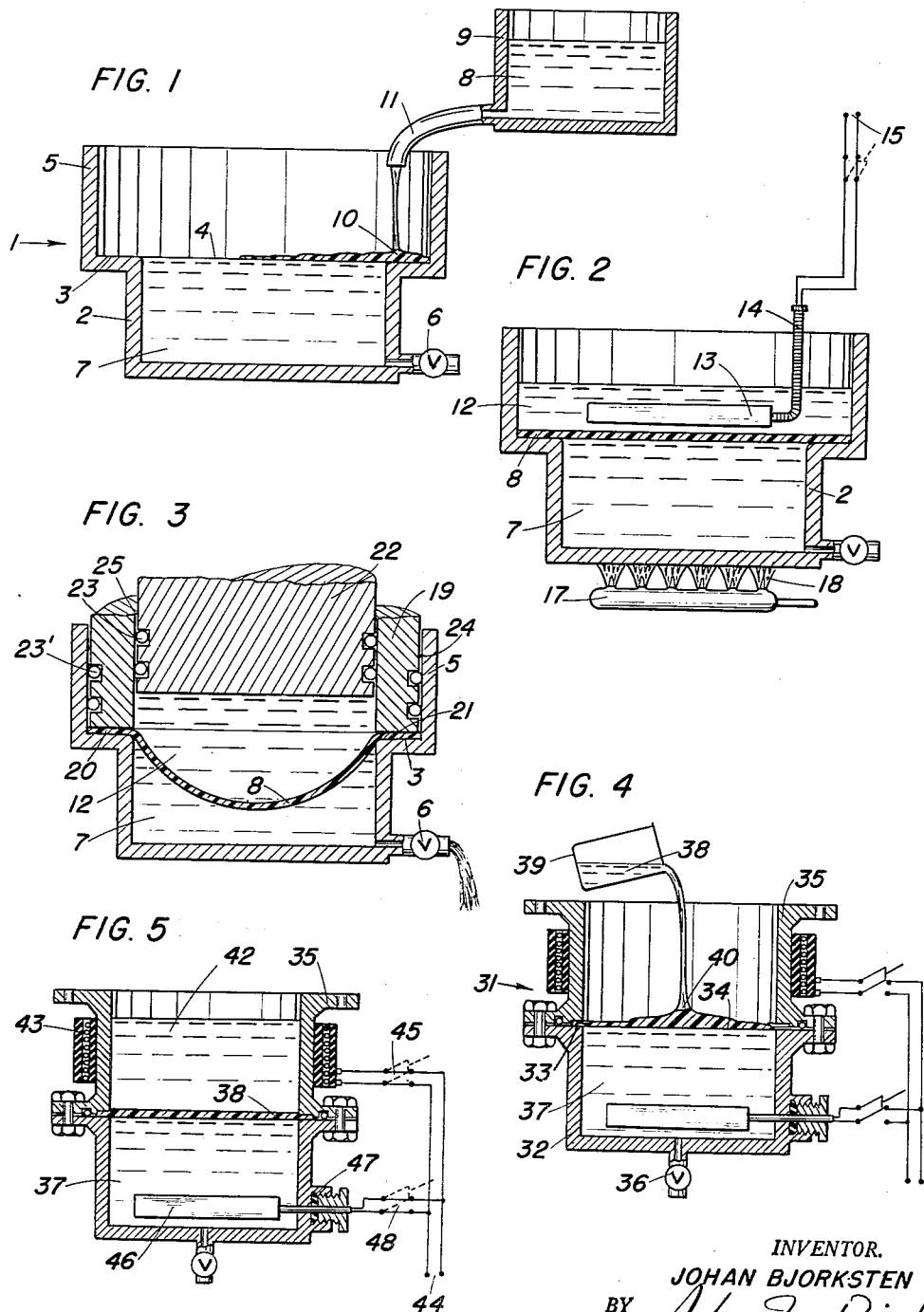
INVENTOR.
JOHAN BJORKSTEN
BY *Johan L. Diehl*
Attorney Aug. 28, 1956
J. BJORKSTEN
2,760,233
METHOD OF MAKING CURVED SHEETS FROM POLYMERIZABLE MATERIAL
Filed Oct. 11, 1952
5 Sheets-Sheet 2
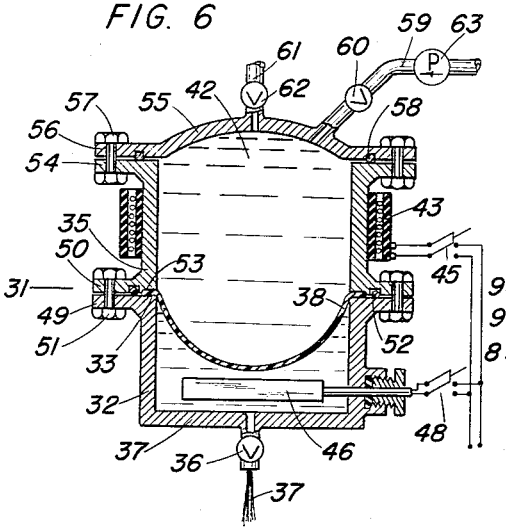
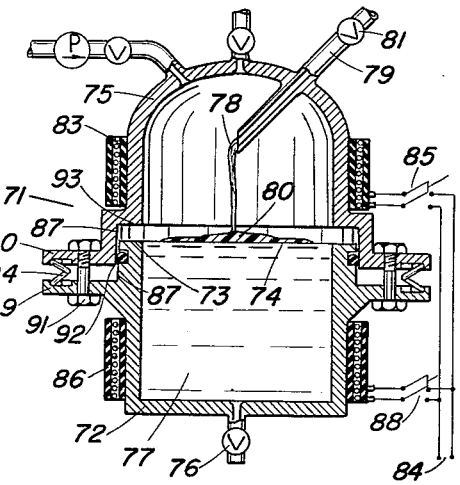
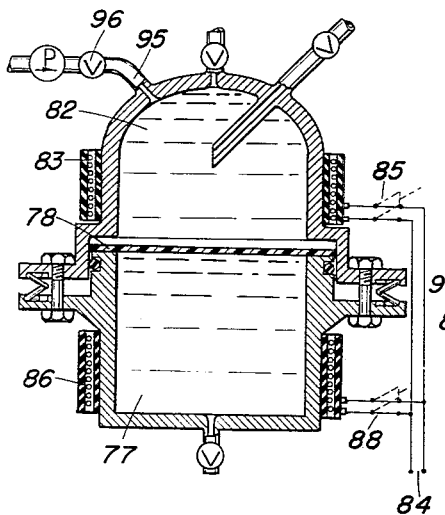
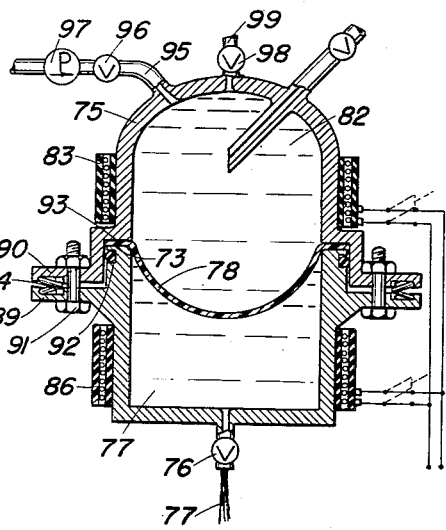
INVENTOR.
JOHAN BJORKSTEN
BY
Attorney

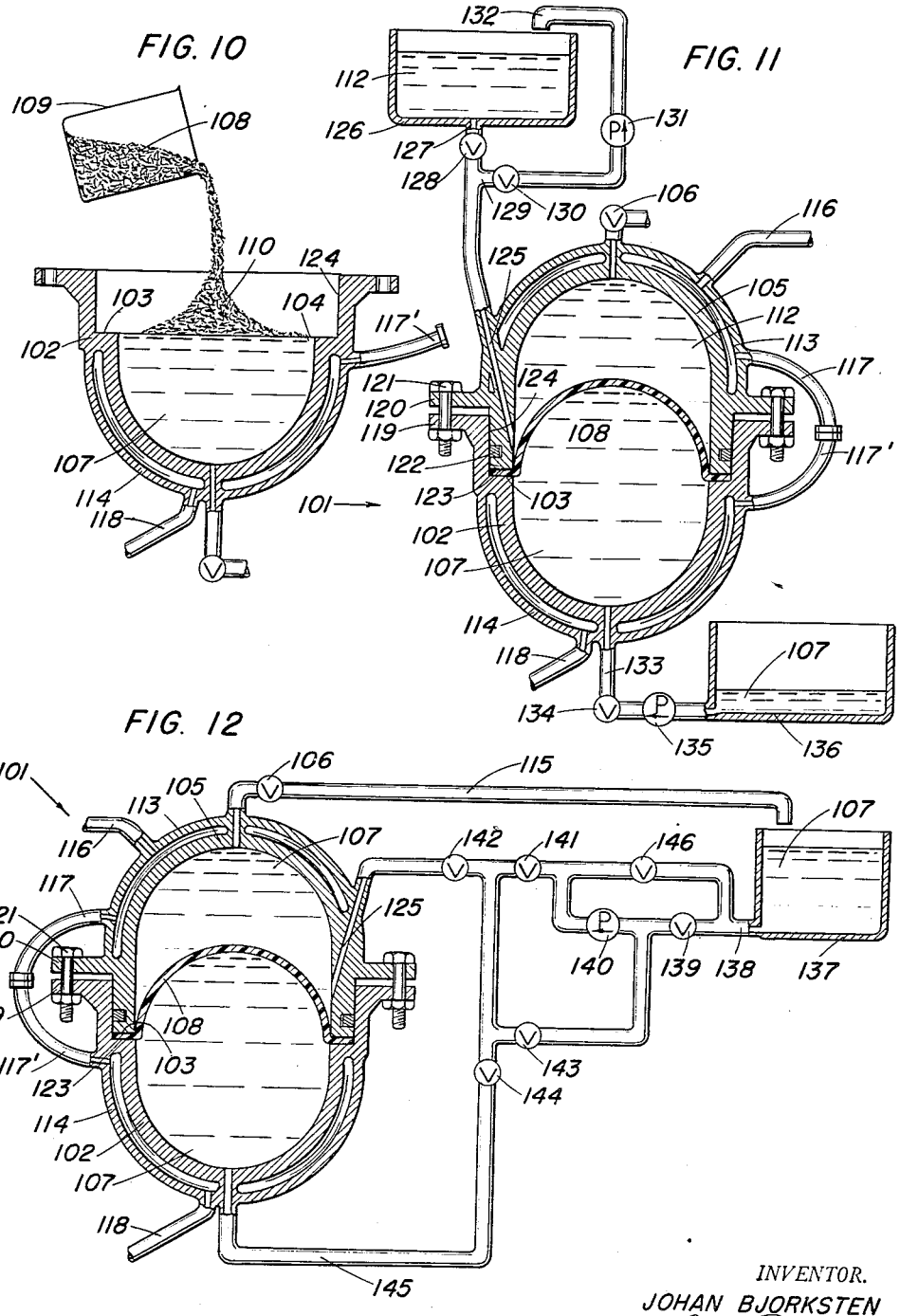

Aug. 28, 1956

J. BJORKSTEN 2,760,233

METHOD OF MAKING CURVED SHEETS
FROM POLYMERIZABLE MATERIAL

Filed Oct. 11, 1952

INVENTOR.
JOHAN BJORKSTEN
BY
Attorney

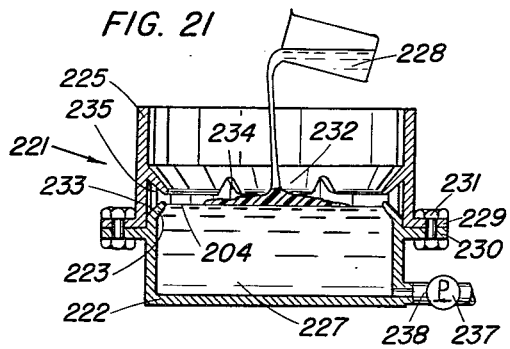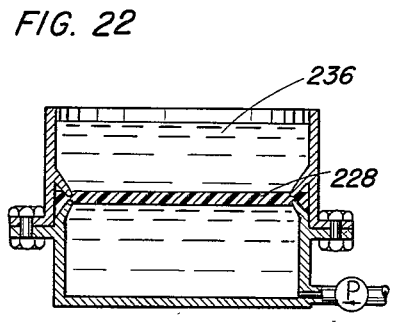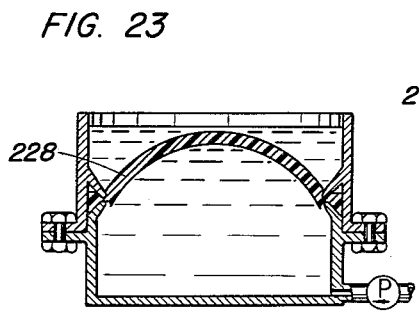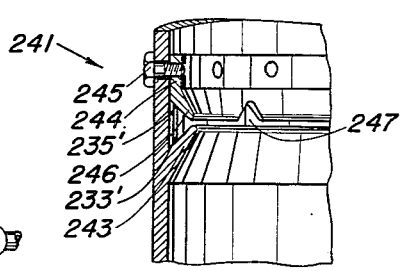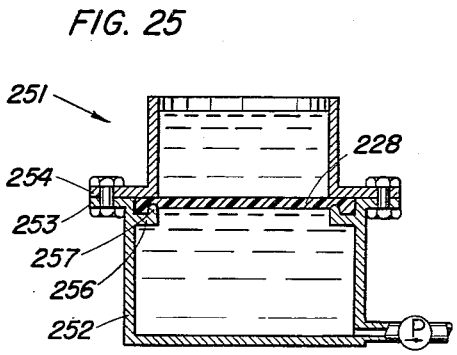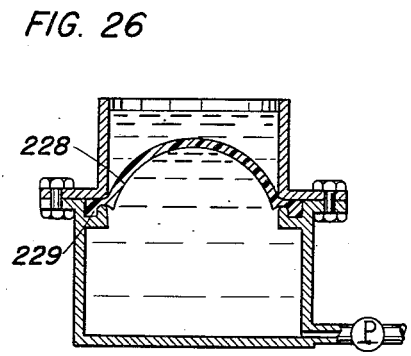

United States Patent Office 2,760,233
Patented Aug. 28, 1956

2,760,233

METHOD OF MAKING CURVED SHEETS FROM POLYMERIZABLE MATERIAL

Johan Bjorksten, Madison, Wis.

Application October 11, 1952, Serial No. 314,351

18 Claims. (Cl. 18—58)

This invention relates to a method for making curved sheet articles of synthetic resin and more particularly to a method and device for making such articles which involves no transfer of the article from one device to another prior to its completion.

Surfaces which may be formed of or from flat sheets may suitably be grouped into four classes, thus:

(1) Flat sheets themselves are typified by the fact that they are curved in no planes. That is, the intersections of such a surface with any arrangement of three mutually perpendicular planes produce lines which are in no case curved.

(2) The second class of surfaces includes those which can be produced by the bending of a flat sheet without stretching any part of it. These are known as "developable surfaces" and may be referred to as curved in one plane, since the intersections of such a surface with three mutually perpendicular planes, so oriented as to produce a maximum of straight lines of intersection, are straight lines in two planes and curved in the third plane. This class of surfaces includes cylinders, and cones.

(3) The third class of surfaces includes those with which topologists are often principally concerned. These are generated by a plurality of adjacent, non-parallel straight lines and may be referred to as curved in two planes, since the intersections of such a surface with three mutually perpendicular planes, so oriented as to produce a maximum of straight lines of intersection, are straight lines in only one of the planes and curves in the remaining two planes. This class includes saddles, hyperbolic paraboloid and hyperboloids of one sheet, as well as many less familiar surfaces. Such surfaces can be produced from flat sheets only by stretching (distorting) portions of the sheets.

(4) The fourth class of surfaces consists of such well-known compound surfaces as spheroids, ellipsoids, toroids and others, surfaces which are curved in three planes. The intersections of such surfaces with three mutually perpendicular planes are all curves, no matter how said planes are oriented with respect to the surfaces. Such surfaces can be made from flat sheets only by stretching (distorting) portions of the sheets. These surfaces may or may not be surfaces of revolution, and include such forms as those found as radar domes, navigation observation domes, bomber noses, aircraft windows, and the like.

Heretofore the production of synthetic resin sheets curved in three planes such as are necessary for radar domes, navigation observation domes, bomber noses, aircraft windows, and the like has involved the use of heavy press equipment utilizing extremely expensive and complicated dies and generally requiring heating equipment in the platens of the presses, and has thus involved the use of extremely cumbersome and expensive equipment which could not be adapted to the production of different such items easily, since new dies have been required for each new item.

Also, it has been necessary to provide specialized plastic laminates which could be formed in hot presses and which therefore would have low softening point or low tensile strength before being so formed but which could be cured thereafter to form high tensile strength laminates having a heat resistant inter-layer in order to provide laminates which would be resistant to the high skin temperatures encountered in supersonic aircraft.

The disadvantages of methods heretofore used for forming such articles are overcome by my invention which is particularly well adapted to produce sheet articles formed in three planes but which may also be adapted to form articles curved in 0, 1 or 2 planes. I form a layer or layers of synthetic resinous material and then polymerize these to form a sheet comprising one or several layers of synthetic resin directly in the device in which forming is accomplished. Thus I may produce in a single device a curved sheet or laminate of synthetic resin.

An object of this invention is therefore to provide a superior method for conveniently and economically producing curved sheet articles of synthetic resin.

Another object is a method of producing curved sheet articles of synthetic resin in which a single device is provided for producing a sheet and forming it into the desired article.

Another object is a device for producing sheets and laminates of polymerizable material and forming these into curved articles.

Further objects will become apparent from the drawings and the following detailed description in which like reference numerals refer to like parts, and in which it is my intention to illustrate the applicability of my invention without thereby limiting its scope and in which:

Figure 1 is a cross-section of one embodiment of the device of the invention showing polymerizable material being introduced into the device;

Figure 2 is a cross-sectional view of the same embodiment showing another step in the process;

Figure 3 is a cross-sectional view of the same embodiment showing a third step in the process;

Figure 4 is a cross-sectional view of another embodiment showing polymerizable material being added to the device;

Figure 5 is another view of the same embodiment showing another step in the process;

Figure 6 is a cross-sectional view of the same embodiment showing the formation of a curved synthetic resin sheet article;

Figure 7 is a cross-sectional view of another embodiment showing polymerizable material being added to the device;

Figure 8 is a cross-sectional view of the same embodiment showing a polymerization step in the process;

Figure 9 is a cross-sectional view of the same embodiment showing a forming step in the process;

Figure 10 is a cross-sectional view of the bottom portion of another embodiment showing polymeric material being added to the device;

Figure 11 is a cross-sectional view of an assembled device incorporating the bottom portion of Figure 10;

Figure 12 is a cross-sectional view of the device according to Figure 11 provided with a different arrangement for introducing and removing liquids;

Figure 14 is a schematic cross-sectional view showing a polymerization step in the process;

Figure 15 is a schematic cross-sectional view showing the formation of another layer of polymeric material;

Figure 16 is a schematic cross-sectional view showing a polymerization step in the process;

Figure 17 is a schematic cross-sectional view showing the formation of another layer of polymeric material;

Figure 18 is a schematic cross-sectional view showing a polymerization step in the process;

Figure 19 is a schematic cross-sectional view showing a forming step in the process;

Figure 20 is a schematic cross-sectional view showing a polymerization step in the process;

Figure 21 is a cross sectional view of another embodiment, which differs from previous embodiments primarily in providing different means for gripping the edge of a ploymeric sheet, showing the formation of a floating sheet of polymeric material;

Figure 22 is a cross-sectional view of the same embodiment showing a sheet of polymeric material floating on one liquid and covered with another liquid;

Figure 23 is a cross-sectional view of the same embodiment showing the formation of a curved sheet of polymeric material;

Figure 24 is a cross-sectional view of a portion of a modification of the embodiment of Figures 21 to 23;

Figure 25 is a cross-sectional view of another embodiment in which a different form of gripping means is provided for the edge of a sheet of polymeric material;

Figure 26 is a cross-sectional view showing a forming step in the process carried out in the embodiment of Figure 25.

Figure 13:
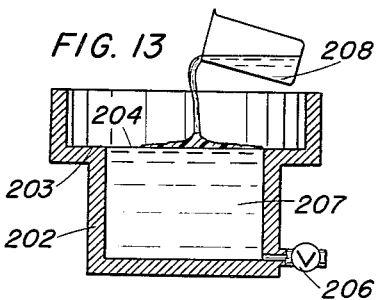
Figures 13 to 20 are schematic cross-sectional views showing steps in the process of making a curved laminated article of synthetic resin according to the inventions and Figure 13 is a schematic cross-sectional view showing a step in the process in which polymeric material is formed into a floating layer.

Referring now to Figure 1 there is shown a container indicated generally as 1 having a lower portion 2 adapted to contain a liquid, a ledge 3 adapted to be in the same plane as the upper surface 4 of the liquid 7 contained in portion 2 and an upper portion 5 adapted to contain a liquid which may have its surface open to the air as shown. A valve 6 is provided in lower portion 2 to provide for discharge of liquid 7 from portion 2. Monomeric or prepolymeric synthetic resinous material is contained in receptacle 9 and is introduced through tube 11 into the device at 10 where it floats on the upper surface 4 of liquid 7 and outward and forms a sheet-like layer thereon. In order to accomplish this result, it is obvious that the specific gravity of liquid 7 must be slightly greater than that of monomeric liquid plastic 8. A suitable liquid for this purpose may be for example water, having a specific gravity of approximately 1.0 in such cases as said resinous material may have a specific gravity of somewhat less than 1.0, such as for example 0.8.

As shown in Figure 2 receptacle 9 with tube 11 may be withdrawn from the device and liquid 12 poured into upper portion 5 of the device on top of the upper surface of the sheet-like layer of material 8. Liquid 12 may be a liquid having a lower specific gravity than that of monomeric or prepolymeric resinous material 8. If the specific gravity of material 8 is for example 0.8 or 0.9 a suitable liquid for this purpose may have a specific gravity of about 0.7 and may be for example one of the alcohols, or may be some other liquid which is a non-solvent for the plastic used in the particular operation and has a specific gravity lower than that of material 8. However it is not always preferred that the specific gravity of liquid 12 be lower than that of material 8, as will be discussed more fully below. If partial polymerization of material 8 is accomplished by heating liquid 7 prior to the addition of liquid 12, material 8 may have sufficient strength so that it does not float upward through a liquid having higher specific gravity. The invention, of course, is not restricted to any particular monomeric or prepolymeric synthetic resinous material since many resins may be applicable and useful in the device and method.

Both thermoplastic and thermosetting resins may be plasticizers, fillers, pigments, dyes or other ingredients if desired. Instead of including plasticizers, blends of polymers may be used, such as polyvinyl chloridenitrile rubber and polyisobutylene which may be mixed or copolymerized with other ingredients. Suitable resins may include any of the following: fluoropolymers, more specifically a polymer selected from the group consisting of polymerized tri- and tetra-haloethylene, wherein the halogen is fluorine, chlorine or both; polymers and coployments comprising polystyrene or halogenated polystyrene such as copolymers of either or both of these with another polymer such as polyacrylonitrile, polybutadiene, pentadiene or maleic acid condensation products; polyamides; polyacrylonitriles; polyvinyl chloride and copolymers of polyvinyl chloride with polyvinylidene chloride and/or polyvinyl acetate; copolymeric polyvinyl chloride-acrylonitrile polymers; polymers and copolymers comprising acrylic acid, methacrylic acid, or alkyl esters of either; polysulfones such as butene and ethylene sulfones; polyvinyl acetals such as polyvinyl butyral, which may be treated with a suitable cross-linking agent; polyhydrocarbons such as polyethylene; mixed and unmixed cellulose esters and ethers; silicone resins; polyesters and styrenated polyesters; and phenolic resins such as phenol-formaldehyde, urea-formaldehyde and melamine-formaldehyde resins.

Liquids 12 and 7 may be heated in order to accomplish the partial polymerization of material 8. This may be accomplished for example by the introduction into liquid 12 of electric heater 13 provided with water resistant cable 14 carrying electric current from source 15. Liquid 7 may be heated by any suitable device such as for example gas heater 17 shown disposed underneath lower portion 2 of container 1 having a plurality of gas flames 18 impinging against the bottom of said container.

After accomplishing the partial polymerization of material 8 it may then be formed into a curved sheet article as shown in Figure 3 wherein the hollow die 19 is pressed down by means not shown, such as by a hydraulic press or other methods well known to the prior art, to tightly grip the edges 20 of material 8 between ledge 3 and the bottom surface 21 of die 19 so that edges 20 will not be displaced by formation of the central portion of the material 8 into a curved article. A centrally disposed die 22 is then pressed down against liquid 12 by suitable means and thus transmits pressure to the upper surface of layer 8 and thence to liquid 7 which is discharged through valve 6. Layer 8 is thus caused to assume a curved form, the proportions and dimensions of which may be specifically controlled by controlling the shape and size of container 1 and ledge 3 and correspondingly the abutting surfaces of dies 19 and 22 and also by controlling the amount of liquid which is allowed to be discharged through valve 6 during the forming operation. Packing means such as O rings 23 and 23' may be provided in the outer cylindrical surfaces of die elements 19 and 22 to prevent seepage of liquid 12 through the annular aperture 24 between the upper portion 5 of container 1 and die 19 and also through the annular aperture 25 between die 19 and die 22.

After completing the forming operation as shown in Figure 3 liquids 7 and 12 may again be heated as shown in Figure 2 to accomplish the final polymerization of material 8 to the degree desired to make it suitable for use in a commercial application such as for example an aircraft navigator's dome.

Referring now to Figure 4 there is shown another embodiment comprising a container indicated generally as 31 comprising two separate portions, lower portion 32 being adapted to contain a liquid and provided with a ledge 33 adapted to be in the same plane as upper surface 34 of the liquid 37 contained in portion 32 and an upper portion 35 adapted to contain a liquid. A valve 36 is provided in lower portion 32 to provide for discharge of liquid 37 from portion 32. Monomeric or prepolymeric synthetic resinous material 38 is contained in a receptacle 39 and is introduced into the device at 40 where it flows outward and forms a sheetlike layer floating on the upper surface 34 of liquid 37 as a result of providing as liquid 37 a liquid which has a specific gravity slightly greater than that of material 38. Liquid 37 may be for example, a solution of an organic or inorganic salt in water and may, for example, have a specific gravity of 1.1 when the specific gravity of material 38 is 1.0.

As shown in Figure 5, after material 38 has flattened out into sheetlike form, liquid 42 may be introduced into the upper portion 35 of the device on top of material 38. Liquid 42 may have a lower specific gravity than that of material 38 and may, for example, be a hydrocarbon oil or the like having a specific gravity lower than 1.0 when the specific gravity of material 38 is approximately 1.0. It is preferable that liquid 42 not be a solvent for material 38, but it may be applicable to provide in some instances as liquid 42 a liquid having a specific gravity greater than that of material 38. This may be suitably accomplished where the sheet of material 38 is partially polymerized prior to introducing liquid 42 and in such event liquid 42 may be identical as the liquid 37. Material 38, as well as material 8, may, of course, be any suitable polymerizable material.

Liquids 37 and 42 may be heated in order to accomplish the partial or complete polymerization of material 38. This may be accomplished, for example, by heating liquid 42 with electric heating unit 43 which is provided with electric current from source 44 flowing through switch 45, which is thrown to the closed position as shown, in order to heat liquid 42. Liquid 42 may, of course, be heated by any other suitable means known to the prior art, such as by the use of a steam jacket surrounding portion 35, by a heater inserted in liquid 42 and the like. Liquid 37 may suitably be heated by an electric immersion heater 46 inserted therein through packing gland 47, which is provided with electric current from source 44 and is caused to heat liquid 37 by throwing switch 48 to the closed position, as shown. After accomplishing the desired degree of polymerization of material 38, it may then be removed as a flat sheet or may be formed into a curved article, as shown in Figure 6. Bottom portion 32 is provided at its upper marginal edge with flange 49, the upper surface of said flange providing ledge 33 adjacent to the bottom surface of the sheet of material 38. Flange 50 is provided at the bottom marginal edge of upper portion 35 and is adapted to mate with flange 49, thus permitting portions 32 and 35 to be secured together by bolts 51 passing through mating holes in flanges 49 and 50. Sealing means 52, which may be an O-ring or copper gasket or any other packing or sealing means known to the art for sealing pressure vessels, is provided between the flanges 49 and 50 to prevent escape of liquid thru the joint between the flanges. A portion of the lower surface of flange 50 is cut away to provide annular surface 53 parallel with and directly above ledge 33 and adjacent the lower marginal edge of the internal surface of portion 35, surface 53 being spaced apart from ledge 33 substantially the same amount as the thickness of the desired sheet of material 38, or a distance less than said thickness. As material 38 polymerizes it may become somewhat attached to surfaces 33 and 53 which thus hold the marginal edge of the sheet of material 38 in place during the forming operation.

The upper marginal edge of upper portion 35 is provided with flange 54 and portion 35 is provided with cover 55 which may have a flange 56 adapted to mate with flange 54 and be secured thereto by bolts 57 passing thru mating holes in said flanges. Sealing ring 58, or other suitable sealing or packing means may be provided to prevent the escape of liquid thru the joint between the flanges. An additional amount of liquid 42 may then be introduced into the vessel thru tubing 59 which may be closed by valve 60. As liquid 42 is introduced, air is trapped in the top of the vessel and this air may be allowed to escape thru vent 61 which may be closed by valve 62. After the upper chamber has become completely filled with liquid 42, valve 62 is closed and additional liquid 42 may be forced into the chamber under pressure thru tube 59 by pump 63. Hydraulic pressure is thus built up within the upper portion of the chamber which is transmitted to the upper surface of material 38 and thence to liquid 37, which may be discharged thru discharge valve 36. As additional liquid is pumped in under pressure above the sheet of material 38 and as liquid 37 discharges from the chamber below material 38, the sheet of material 38 assumes a downwardly curved form. The shape of the resulting article may be controlled by varying the shape of container 31 and the amount of liquid 37 which is discharged. Material 38, if desired, may be maintained at an elevated temperature during the forming operation by continuing to heat liquids 42 and 37 instead of disconnecting the heaters by opening switches 45 and 48 as shown.

It is, of course obvious that sheet 38 may be formed by causing it to curve upwardly instead of downwardly either by reversing the attitude of container 31 or by pumping additional liquid 37 into the container and allowing liquid 42 to discharge instead of vise versa in the event that material 38 has become sufficiently polymerized to retain its sheet form, the apparatus may be placed in any position whatsoever. By polymerizing material 38 to such a degree that it retains its shape only partially or by heating it to a temperature somewhat above its softening point during the forming operation and simultaneously tilting the device at an angle, a non-symmetrical curved plastic sheet object may be formed which may be desirable in some instances.

The sheet of material 38, after forming, may then be further polymerized by again heating liquids 37 and 42 by connecting heaters 43 and 46 through switches 45 and 48 and either before or after such additional polymerization, the article may be removed from the device by unfastening bolts 51 and lifting portion 35 off of portion 42.

Referring now to Figures 7, 8 and 9, there is shown another embodiment wherein the container indicated generally as 71 has a lower portion 72 adapted to contain a liquid and an upper portion 75 also adapted to contain a liquid. The upper marginal edge of portion 72 is provided with ledge 73 which may be in the same plane with the upper surface 74 of the liquid 77 contained in portion 72. A valve 76 is provided in lower portion 72 to provide for discharge of liquid 77 from portion 72. The level of liquid 77 is adjusted so that upper surface 74 is level with ledge 73 and monomeric or prepolymeric synthetic resinous material 78 is then introduced into the device thru tube 79, which is provided with valve 81 by means of which the flow of material 78 may be controlled. Material 78 spreads out at 80 on surface 74 of liquid 77, floating thereon, liquid 77 having been selected as having a specific gravity slightly greater than that of material 78. Material 78 is thus formed into a flat sheet. Liquid 82 which may have a specific gravity greater or less than that of material 78 may then be introduced into the device thru tube 95 by opening valve 96. Liquids 77 and 82 may be identical if desired, although it is often preferable that the specific gravity of material 38 be higher than that of liquid 82. Liquids 77 and 82 are of course preferably non-solvents for material 78.

Liquids 77 and 82 may be heated in order to accomplish partial polymerization of material 78. This may be accomplished for example by providing heating means such as electric heaters 83 and 86 disposed about the outer circumferences respectively of portions 75 and 72, which are provided with current from source 84 thru switches 85 and 88. By closing switches 85 and 88 as shown in Figure 8 electric current passes thru the heaters and heats liquids 82 and 77. Other heating means known to the art are, of course, suitable.

After accomplishing at least partial polymerization of material 78 it may then be formed into a shaped article as shown in Figure 9. Portion 72 is provided with outwardly extending flange 89, somewhat remote from its upper marginal edge, and portion 75 is provided at its lower marginal edge with flange 90 adapted to mate with flange 89. The lower marginal portion of 75 is recessed to provide a surface 93 adapted to mate with ledge 73 at the upper marginal edge of portion 72 and is further provided with an internal surface 87' adapted to slide over the outer surface 87 of portion 72, adjacent its upper marginal edge so that parts 72 and 75 have an essentially telescopic relationship. The joint between surface 87 and 87' may be sealed with any suitable sealing device, for example an O-ring, 92, in order to prevent leakage of liquid out of said joint. The portions 72 and 75 are maintained in spaced apart relationship by springs such as coil springs 94 interposed between flanges 89 and 90, the said spaced apart relationship being maintained during the formation of the flat sheet of material 78 and during its partial polymerization. Portions 72 and 75 may then be forced together by tightening bolts 91, passing thru mating holes in flanges 89 and 90 together. When said flanges are brought together mating surfaces 73 and 93 are also forced together and the edge of the sheet of material 78 which may be interposed between surfaces 73 and 93 as a result of forming the layer with its bottom surface coextensive with and in the same plane as surface 73, is firmly gripped between surfaces 73 and 93. Additional liquid 82 may then be introduced into the top of the chamber under pressure thru tube 95 by means of pump 97, the residual air remaining in portion 75 above the surface of liquid 82 being allowed to vent thru vent 99 by opening valve 98. After such air is vented, valve 98 is closed and, as additional liquid 82 is pumped into chamber 75, liquid 77 is allowed to escape thru discharge valve 76. The resulting pressure differential between the higher pressure of liquid 82 and the lower pressure of liquid 77 causes material 78 to assume an arcuate form extending downward as shown in Figure 8.

The forming operation just referred to may be carried out while liquids 82 and 77 continue to be heated by heaters 83 and 86 or it may be carried out during a discontinuance in such heating. It may also be carried out in such manner as to cause the resultant article to curve upward either by changing the attitude of the device or by pumping in additional liquid 77 while discharging liquid 82. After being formed, the sheet of material 78 may be finally polymerized to a desired degree by again closing switches 85 and 88 and activating heaters 83 and 86 to heat liquids 82 and 77.

After being formed and finally polymerized, the resulting article is removed from the device by unfastening bolts 91 and lifting portion 75 off from portion 72.

Referring now to Figures 10, 11 and 12 the vessel indicated generally as 101 is made of two principal parts, lower part 102 and upper part 105, which may be matably secured together to form an enclosed pressure vessel.

As shown in Figure 10, part 102 may have the general form of an open receptacle and may be provided with a ledge 103 at its upper marginal edge adapted to be in the same plane with the upper surface 104 of liquid 107 which may be introduced thereinto, which may, for example, be an organic liquid having a specific gravity of about 0.85. Polymeric molding powder 108, contained in container 109 may then be poured onto the surface 104 of liquid 107 where, at 110 it piles up and then spreads, floating on the surface of liquid 107, material 108 having been suitably selected to have a specific gravity lower than that of liquid 107; material 108 may, for example, suitably have a specific gravity of 0.80 where that of liquid 107 is 0.85. Since material 108 is not a liquid it does not form a sheet immediately but may be formed into a sheet by heating liquid 107, which may be accomplished by any heating means known to the prior art suitable for such application, such as, for example, the use of an electric heater inserted in the liquid 107 or surrounding part 102, or a gas flame heating operating either inside or outside part 102, but a suitable means also is to provide an additional heating jacket 114 thru which steam may be passed, spaced apart from the outer surface of part 102 and provided with inlet 117' and outlet 118. As liquid 107 is heated material 108 is softened and forms a sheet floating on the surface 104 of liquid 107. If the degree of polymerization of material 108 is insufficient, it may be further polymerized by continuing to heat liquid 107 or it may be polymerized somewhat more uniformly by adding liquid 112 and heating it at the same time. Liquid 112 may have a lower specific gravity than material 108 and may be retained above material 108 by the inner wall 124 or part 102, extending above ledge 103. At such time as the degree of polymerization of material 108 is suitable, for example, when it is such that material 108 is soft and formable at room temperature or at a temperature somewhat above room temperature which may be easily maintained by heating liquids 107 and 112, it may be formed into a curved article.

Part 105 may then be placed on top of part 102 as shown in Figures 11 and 12. Part 105 is provided at its lower marginal edge with a surface 123 corresponding in width to surface 103 of part 102 and fits slidably inside surface 124 of part 102, being provided with sealing ring 122, or other suitable sealing means, on its external surface close to its marginal edge in order to seal the joint between said surface and surface 124 of part 102 to prevent escape of liquid thru said joint. Part 102 may be provided at its upper marginal edge with outwardly extending flange 119 adapted to mate with flange 120 extending outwardly from part 105. Flanges 119 and 120 may be secured tightly together by bolts 121 passing thru mating holes therein. When bolts 121 are tightened surfaces 103 and 123 are forced together, thus compressing and firmly gripping the outer marginal edge of the sheet of material 108 previously referred to. Additional liquid 112 may then be introduced into the interior of part 105 above the sheet of material 108 thru 125. The means provided for introducing liquid 112 thru tube 125 is not in any way critical but a suitable method for accomplishing this may be to provide a reservoir 126 in which a supply of liquid 112 is contained. Reservoir 126 may suitably have an outlet 127 closeable by valve 128 from which liquid 112 may flow by gravity through tube 125 into part 105. As material 112 flows into the interior of part 105, the residual air remaining therein may be vented thru discharge valve 106. When part 105 is full of liquid 112 and all air has been vented therefrom, valve 106 may be closed and the sheet of material 108 formed into a curved sheetlike article by pumping an additional quantity of liquid 107 into part 102 from reservoir 136 by operating pump 135 and opening valve 134 in tube 133 leading into the bottom of part 102.

Liquids 112 and 107 may be heated during the forming operation, if desired, by passing steam thru inlet 116 into the steam jacket formed between the outer surface of part 105 and jacket 113, thence thru outlet 117 connected to inlet 117', thence thru the space between the outer surface of part 102 and jacket 114 and then out outlet 118. After material 108 has been formed into a sheet of a desired shape it may be finally polymerized to a desired degree by heating liquids 112 and 107 in a similar manner.

In order to remove the curved sheetlike article from the device, liquid 112 may first be removed from part 105 by closing valve 128, opening valve 106, opening valve 130 in tube 129 leading from tube 125 and operating pump 131 in tube 129 which pumps liquid 112 out of 105 into reservoir 126 thru tube 132. Bolts 121 may then be unfastened, part 105 may be lifted off of part 102, and the formed article may be removed.

In Figure 12 there is shown another embodiment in which a sheet of partially polymerized material 108 is formed across the interior of the vessel indicated generally as 101 in the same manner as described in connection with Figures 10 and 11. Instead of being provided with a liquid of greater specific gravity on which material 108 floats and a material of lesser specific gravity which is introduced above material 108, only a single liquid is introduced, said liquid having a specific gravity at least slightly greater than that of material 108. The use of a single liquid is accomplished by first forming material 108 into a partially polymerized sheet floating on the top of the surface of liquid 107 contained in part 102. Part 105 is then set on top of part 102 and bolts 121, which secure together mating flanges 119 and 120 on the two respective parts, are tightened, thus forcing mating surfaces 103 and 123 together in such manner as to grip the edge of the sheet of partially polymerized material 108. Steam connections 117 and 117' may be connected together. Liquid 107, which is contained in reservoir 137, may then be introduced into part 105 above the sheet of material 108 thru tube 125 by operating pump 140. This is accomplished by opening valve 139, 141 and 142, other valves being closed, and pumping liquid 107 out of reservoir 137 thru outlet 138. Air is entrapped in the upper portion of part 105 and valve 106 is opened in order to vent such air, when all entrapped air has been eliminated as may be observed from flow of liquid 107 thru tube 115 back into reservoir 137, valves 142 and 106 may be closed and liquid 107 may be pumped under pressure into part 102 below material 108. This may suitably be accomplished by operating pump 140, which pumps liquid out of reservoir 137 thru outlet 138 thru opend valve 139, 141 and 144, other valves being closed. As pressure is built up in part 102, discharge valve 106 is opened to allow liquid 107 to flow out of part 105 back into reservoir 137. The pressure differential thus created causes the sheet of material 108 to become disposed in an arcuate form upwards.

The curved sheet of material 108 may be polymerized to its final desired state by again heating liquid 107 both above and below material 108.

After completion of polymerization, the curved sheet article may be removed from the device with facility by first removing liquid 107 from part 105 above the curved article. This may suitably be accomplished by opening valve 106 and by operating pump 140 to pump liquid 107 out thru tube 125 thru open valve 106 and by operating pump 140 to pump liquid 107 out thru tube 125 thru open valves 142, 143 and 146, other valves being closed; liquid 107 being returned to reservoir 137 thru tube 138. When liquid 107 has been removed from part 105, steam lines 117 and 117' may suitably be disconnected, bolts 121 may be removed and part 105 may be lifted off part 102. The completed article may then easily be removed.

Article 108 may be formed with a curve downward instead of upward by changing the attitude of the device or by pumping in additional liquid 107 to part 105 while discharging liquid 107 out of part 102.

Figure 14:
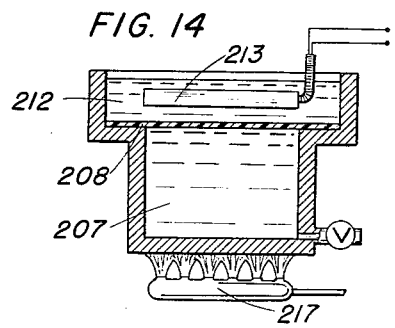
Figure 15:
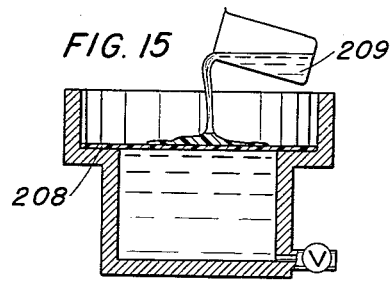
Figure 16:
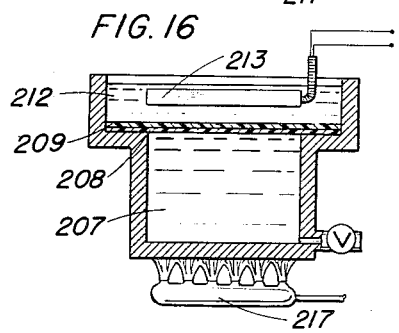
Figure 17:
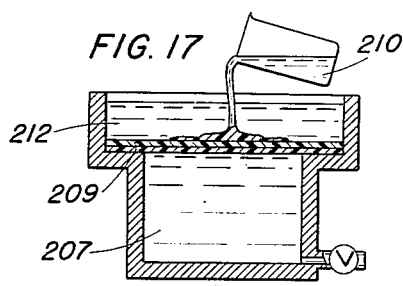
Figure 18:
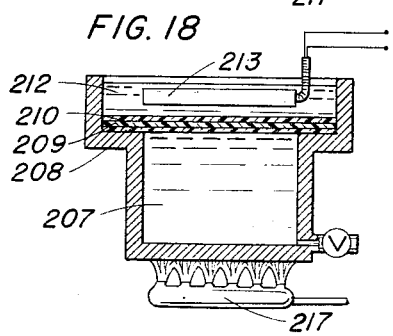

Referring now to Figures 13 to 20 there is illustrated the method of my invention whereby a curved laminated sheet article may be formed by carrying out a process in a single device. Receptacle 202, adapted to contain a liquid such as liquid 207, is provided with a ledge 203 which is adapted to be in the same plane as the upper surface of liquid 207 and container 202 is further provided with a discharge valve such as valve 206. The vessel 202 is first filled with liquid 207 to the level of ledge 203. Monomeric or pre-polymeric material 208 is then poured onto the surface 204 of liquid 207 where it spreads out, forming a floating sheetlike layer, liquid 207 having been selected as being a non-solvent for material 208 and as having a slightly higher specific gravity than material 208. As shown in Figure 14, liquid 212, having a specific gravity slightly lower than that of liquid 208 and being a non-solvent therefore may then be added on top of the layer 208 and the layer of liquid 208 may be wholly or partially polymerized by heating liquids 207 and 212 by any suitable means such as, for example, electric heater 213 and gas heater 217. As shown in Figure 15, monomeric or pre-polymeric material 209, adapted to polymerize when heated to form a suitable interlayer material for a laminate, is poured onto the top of layer 208 where it spreads out to form a sheetlike layer. The layer of material 209 may then be polymerized by again heating liquids 207 and 212 as shown in Figure 16 or if desired by heating merely liquid 212. It may be mentioned that liquid 209, shown as being added on top of material 208 after first removing liquid 212, may suitably be added by pouring it thru liquid 212 when liquid 209 has a specific gravity lower than that of liquid 212. After accomplishing the partial polymerization of material 209, another layer of monomeric or pre-polymeric material may be formed on top of the layer of material 209 by adding additional monomeric or pre-polymeric material 210, which may be the same as material 208 or may differ therefrom. Liquid 212 may be selected as having a specific gravity lower than that of material 210 and if so, liquid 210, as shown in Figure 17, may be added thru liquid 112. Material 210 may be polymerized to a desired degree by again heating liquid 212 by means of heater 213 as shown in Figure 18. It may be also desirable to heat liquid 207 at the same time by means such as heater 217.

Figure 19:
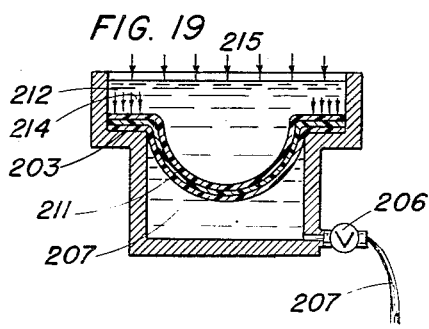
Figure 20:
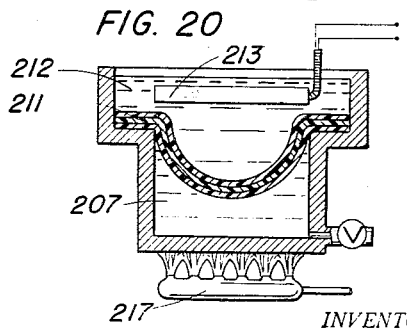

As shown in Figure 19 the laminate or sandwich 211 formed of the layers of materials 208, 209 and 210 may then suitably be formed into a curved laminated article 211 by providing pressure means 214 acting in cooperation with ledge 203 to securely retain in position the outer edge of the sandwich 211 and by further providing pressure means 215 acting on liquid 212, simultaneously with the discharge of liquid 207 thru valve 206, to create a pressure differential across sandwich 211 and thus force it downward into the desired curved shape. The resulting curved article may be finally cured to the desired state of polymerization by again heating liquids 212 and 207 at such temperature and for such time as may be suitable to attain the desired degree of polymerization in the several layers of laminate 211, any suitable means may be used to heat liquids 212 and 207, such as for example, heaters 213 and 217 as shown in Figure 20.

It will be understood that a laminate of only two layers or a laminate of more than three layers may suitably be formed by the same process, the method not being limited to the formation of a laminate of three layers as shown.

While in all cases it is generally desirable that liquid 207 have a specific gravity greater than that of the material such as material 208, which is immediately in contact therewith and floats on top thereof, it is not necessary of course that liquid 207 have a specific gravity greater than material 209 or any other material added to form a layer on top of the first layer of material formed on top of liquid 207, since the coaction with liquid 207, of a partially polymerized sheet of material overlying its surface will be sufficient to support subsequent materials having a specific gravity greater than that of either material 208 or liquid 207.

When a layer such as 209 is formed on top of a layer such as 208 by pouring a material 209 through a liquid non-solvent therefor such as 212, it is preferable that said liquid have a specific gravity lower than the added material.

However, when a layer of partially polymerized material is covered with a liquid non-solvent therefore merely to facilitate further polymerization by the heating of such liquid, the added liquid may suitably have either a higher or lower specific gravity. This case is not shown in the figures which show only the addition of such a liquid above a substantially unpolymerized material.

Referring now to Figure 21 there is shown a device in which a curved sheet article of synthetic resin may be made which consists of a receptacle indicated generally as 221 comprising a lower part 222 and an upper part 225 secured together by mating flanges 229 and 230 provided with bolts 231. The upper marginal edge of portion 222 extends upwardly and inwardly to form rim 223 which corresponds to projections 232 extending inwardly and downwardly from the interior surface of portion 225. Portion 222 is adapted to contain a liquid 227 which my have its upper surface just below the upper marginal edge of inwardly turned rim 223. Monomeric or prepolymeric synthetic resinous material 228 may be poured onto the upper surface 204 of liquid 227 where, the specific gravity of liquid 227 having been selected as being slightly greater than that of material 228, material 228 spreads out to form a layer as shown in Figure 22. Material 228 flows over the upper edge of rim 223 into the space 233 behind rim 223 and also flows through apertures 234 between projections 232 into space 235 behind projections 232. The layer of material 228 may then be polymerized by heating liquid 227 and also may be polymerized by heating a liquid 236 which may be introduced into the device on top of material 228, being retained by the side walls of part 225. After being somewhat polymerized the layer of material 228 may be formed into an upwardly curved article by introducing additional liquid 227 with pump 237 through tube 238. The edge of the partially polymerized material 228 is securely retained in place by rim 223 and projections 232. The upwardly curved sheet of material 228 thus formed may be finally polymerized by again heating liquids disposed above and below it and may be removed from the device by unfastening bolts 231 and thus detaching part 225 from part 222.

In Figure 24 there is shown another embodiment of a device for producing a curved sheet article in which the edge of a partially polymerized sheet of polymerizable material floating on a liquid having a slightly greater specific gravity is retained in place by an upwardly projecting rim and a downwardly extending projection in a manner similar to that shown in Figures 21, 22 and 23. However in the device of Figure 24 a single receptacle indicated generally as 241 is provided having an annular ring 243 extending from its interior surface upwardly and inwardly and having above said ring 243 an annular ring 244 disposed on its interior surface and attached thereto by bolts 254. Ring 244 is provided with inwardly and downwardly extending projections 246 having apertures 247 therein between. Ring 243 and projections 246 thus cooperate to provide spaces 233' and 235' adjacent to the interior wall of vessel 241 which are adapted to have disposed therein the outer marginal edge of a layer of polymerizable or partially polymerized material floating on the surface of a liquid contained in the lower portion of vessel 241 and thus are further adapted to securely retain in place the outer marginal edge of a layer of partially polymerizable material while said layer is formed into a curved article by the introduction of additional such liquid under pressure.

Referring now to Figure 25 there is shown the detail of another means of securing in place during forming the edge of a sheet of partially polymerized material which has been formed by pouring polymerizable material onto the surface of a liquid and then polymerizing said material. Lower portion 252 of the vessel indicated generally as 251 is provided at its upper marginal edge with outwardly extending flange 253 which mates with the outwardly extending flange 254 at the lower marginal edge of the top part of vessel of 251. The interior surface of part 252 is further provided close to its upper marginal edge with inwardly extending ring 256 having upwardly extending projection 257 from the inner marginal edge thereof. Partially polymerized material 228 extends into and behind projection 257 and, as shown in Figure 26, its outer marginal edge 229 is thus retained in place while the layer of material 228 is formed into an upwardly curved sheetlike article.

The figures and description have shown only the formation of a single article in any particular single device but it should be understood that it is envisaged as within the scope of the invention that several curved articles may be formed in a single device.

The means heretofore described for applying pressure to one side or the other of a layer of partially polymerized material in order to form it into a curved article have included the application of a liquid static pressure differential either upwardly or downwardly across said sheet but the invention encompasses broadly the application of fluid pressure, either dynamic or static, to either side of said sheet to create a fluid pressure differential. This may be accomplished, for example by suspending the sheet in midair and causing a dynamic stream of fluid, either gas or liquid, to impinge against either of its sides. It may also be accomplished for example by providing a gaseous pressure differential across the two sides of the sheet or by providing a gas on one side of the sheet and a liquid on the other and creating a pressure differential between these two fluids, the higher pressure being optionally either in the gas or in the liquid.

A pressure differential may be provided for example by discharging a liquid from a container below the sheet and allowing a gas at atmospheric pressure above the sheet to curve it downward. Similarly, a gas may be pumped into a container below the sheet while its upper surface is covered with a liquid.

It will thus be understood that my invention is broad in scope and is not to be limited to the specific form or arrangement of parts or steps herein described and shown, or specifically covered by my claims.

I claim:
1. The method of producing a curved sheet of synthetic resin comprising preparing a layer of incompletely polymerized preepolymeric material floating on the surface of a liquid having a higher specific gravity than said material and then polymerizing said material and then applying fluid pressure to one side of said layer of material of greater magnitude than the pressure on the other side thereof when it is in a state of at least partial polymerization.

2. The method of producing a curved sheet of synthetic resin comprising preparing a layer of prepolymeric polymerizable material floating on the surface of a liquid having a higher specific gravity than said material, polymerizing said material and causing the edge of said layer to be secured in place substantially immovably, then applying fluid pressure to one side of said layer of material of greater magnitude than the pressure on the other side thereof.

3. The method of producing a curved sheet of synthetic resin comprising providing a body of liquid in a suitable container, pouring on the surface thereof a prepolymeric polymerizable substance having a specific gravity less than that of said liquid so that said substance forms a sheet floating on the surface of said liquid, of causing the edge of said layer to be retained substantially immovably in place, then polymerizing said substance and then causing said layer to become curved by creating a fluid pressure differential across said layer.

4. The method of claim 3 in which said layer is caused to become curved by introducing additional liquid into said container below said layer.

5. The method of claim 4 wherein said layer is caused to become curved by introducing liquid into said container above said layer while liquid is discharged from said container below said layer.

6. The method of claim 4 wherein said layer is caused to become curved by removing liquid from said container on one side of said layer.

7. The method of claim 4 wherein said layer is caused to become curved by introducing gas into said container above said layer while liquid is discharged from said container below said layer.

8. The method of claim 4 wherein said layer is caused to become curved by introducing gas into said container below said layer.

9. The method of producing a sheet of synthetic resin comprising providing a body of liquid in a suitable container, pouring on the surface thereof an incompletely polymerized polymerizable substance having a specific gravity lower than that of said liquid so that said polymerizable substance forms a layer floating on the surface of said liquid, polymerizing said substance and causing the outer marginal edge of said layer to be retained substantially immovably in place, introducing a liquid into said container above the resultant polymeric layer, and causing said layer to become curved by creating a fluid pressure differential across said layer.

10. The method of claim 9 wherein said layer is caused to become curved by introducing liquid into said container on one side of said polymeric layer while liquid is discharged from said container on the other side of said layer.

11. The method of claim 9 wherein said liquid introduced above said polymeric layer has a specific gravity lower than that of said polymeric layer.

12. The method of claim 9 wherein said liquid introduced above said layer has a specific gravity at least as great as that of said polymeric layer.

13. The method of producing a curved sheet of synthetic resin comprising the steps of providing a body of liquid in a suitable container, of pouring on the surface thereof an incompletely polymerized polymerizable substance having a specific gravity lower than that of said liquid so that said substance forms a layer floating on the surface of said liquid, of then introducing into said container above said layer a liquid of then causing said substance to become at least partially polymerized by heating at least one of said liquids, of causing the outer marginal edge of said layer to be retained substantially immovably in place, of causing said layer to become curved by introducing an additional quantity of one of said liquids into said container while discharging a corresponding quantity of the other said liquids, of further polymerizing said layer by heating at least one of said liquids, and of removing said article from said device.

14. The method of claim 13 wherein said liquid introduced into said container above said layer has a specific gravity lower than that of said polymerizable substance.

15. The method of claim 13 wherein said liquid introduced into said container above said layer has a specific gravity at least as great as that of said liquid provided in said container below said layer.

16. The method of claim 13 wherein said retention of said outer marginal edge is accomplished by providing a ledge at the upper marginal edge of the bottom portion of said container and of providing means for causing said ledge, and said surface to compressively grip the outer marginal edge of said layer.

17. The method of claim 13 wherein said retention of said outer marginal edge is accomplished by providing a recess devoid of the liquid on which such substance floats, adapted to allow the outer marginal portion of said layer of polymerizable substance to flow thereinto, and of polymerizing said polymerizable substance so that the outer marginal edge of said layer after polymerization is firmly secured in said recess.

18. The method of claim 13 wherein said retention of said outer marginal edge is accomplished by polymerizing said outer marginal portion in a recess disposed therearound and retaining said outer marginal edge in polymerized form in said recess which provides a space larger than that through which said polymerizable substance in fluid form entered into said recess.

References Cited in the file of this patent

UNITED STATES PATENTS

| | | |
|---|---|---|
| 2,485,372 | Farrell | Oct. 18, 1949 |
| 2,607,081 | Taylor | Aug. 19, 1952 |
| 2,631,334 | Bailey | Mar. 17, 1953 |

FOREIGN PATENTS

| | | |
|---|---|---|
| 474,001 | Great Britain | Oct. 25, 1937 |